United States Patent
Crowley et al.

(10) Patent No.: US 6,666,238 B1
(45) Date of Patent: Dec. 23, 2003

(54) COLLAR FOR FUEL FILLER PIPE

(75) Inventors: Allen G. Crowley, Harbor Beach, MI (US); David D. Chen, Troy, MI (US); Mingchi Michael Tsai, Rochester Hills, MI (US)

(73) Assignee: Dayco Products, LLC, Miamisburg, OH (US)

( * ) Notice: Subject to any disclaimer, the term of this patent is extended or adjusted under 35 U.S.C. 154(b) by 0 days.

(21) Appl. No.: 10/170,985

(22) Filed: Jun. 13, 2002

(51) Int. Cl.[7] .................................................. B65B 1/04
(52) U.S. Cl. ..................... 141/286; 220/86.2; 220/86.1; 285/80
(58) Field of Search ....................... 141/286; 220/86.2, 220/86.1; 285/80, 81, 73, 75

(56) References Cited

U.S. PATENT DOCUMENTS

| | | | |
|---|---|---|---|
| 2,332,347 A | * 6/1943 | Churchman | 70/232 |
| 3,428,337 A | * 2/1969 | Read | 285/81 |
| 3,709,526 A | * 1/1973 | Cromie | 285/73 |
| 4,027,910 A | 6/1977 | Farelli | |
| 4,141,393 A | 2/1979 | Mayer | |
| 4,223,706 A | 9/1980 | McGahey | |
| 4,405,161 A | * 9/1983 | Young et al. | 285/80 |
| 4,544,190 A | * 10/1985 | Swift et al. | 292/307 B |
| 4,552,394 A | * 11/1985 | Kesselman | 292/307 B |
| 4,674,778 A | * 6/1987 | Ruiz | 292/256.6 |
| 5,199,471 A | 4/1993 | Hartman et al. | |
| 5,213,142 A | 5/1993 | Koch et al. | |
| 5,234,036 A | 8/1993 | Butkovich et al. | |
| 5,244,017 A | 9/1993 | Hartman et al. | |
| 5,271,438 A | 12/1993 | Griffin et al. | |
| 5,273,087 A | 12/1993 | Koch et al. | |
| 5,289,856 A | 3/1994 | Strock et al. | |
| 5,295,914 A | 3/1994 | Milavec | |
| 5,325,896 A | 7/1994 | Koch et al. | |
| 5,327,943 A | 7/1994 | Strock et al. | |
| 5,507,324 A | 4/1996 | Whitley, II et al. | |
| 5,520,228 A | 5/1996 | Fink, Jr. et al. | |
| 5,590,806 A | 1/1997 | Green et al. | |
| 5,673,738 A | 10/1997 | Spaulding | |
| 5,735,322 A | 4/1998 | Palvolgyi | |
| 5,791,387 A | 8/1998 | Palvolgyi | |
| 5,803,131 A | 9/1998 | Iwasa et al. | |
| 5,826,918 A | 10/1998 | Bowles et al. | |
| 5,884,958 A | 3/1999 | Oddenino | |
| 6,311,734 B1 | * 11/2001 | Petrovic | 285/45 |
| 6,330,893 B1 | 12/2001 | O'Connell | |
| 6,336,482 B1 | * 1/2002 | Cunkle et al. | 141/350 |
| 6,340,093 B1 | 1/2002 | Zapp | |
| 6,357,618 B1 | 3/2002 | Kloess et al. | |

FOREIGN PATENT DOCUMENTS

EP  0060379 A2  * 1/1982

* cited by examiner

Primary Examiner—Gregory Huson
Assistant Examiner—Khoa Huynh
(74) Attorney, Agent, or Firm—Joseph V. Tassone; J. Daniel Lykins

(57) ABSTRACT

A collar for use in a fuel filler assembly comprising: a first semicircular shaped structure having a first pair of terminal ends which lie in a common vertical plane, each of the terminal ends including at least two locking means, a top edge forming an upper semicircular rim, a bottom edge forming a lower semicircular rim, the top edge and the bottom edge lying in spaced apart horizontal planes with respect to each other, an outer circumferential side separating the top edge and the bottom edge; and a second semicircular shaped structure having a second pair of terminal ends which lie in a common vertical plane, the two terminal ends including at least two locking means, a top edge forming an upper semicircular rim, a bottom edge forming a lower semicircular rim, the top edge and the bottom edge lying in spaced apart horizontal planes with respect to each other, wherein the first semicircular shaped structure and the second semicircular shaped structure are locked together at the first and the second pair of terminal ends.

18 Claims, 2 Drawing Sheets

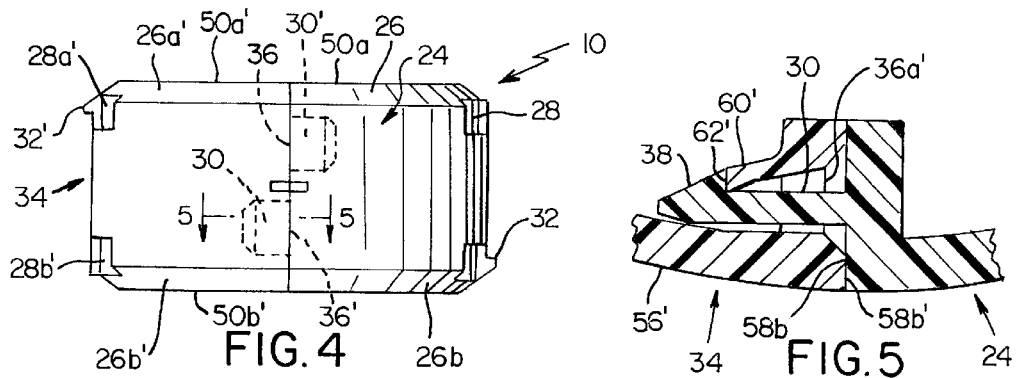
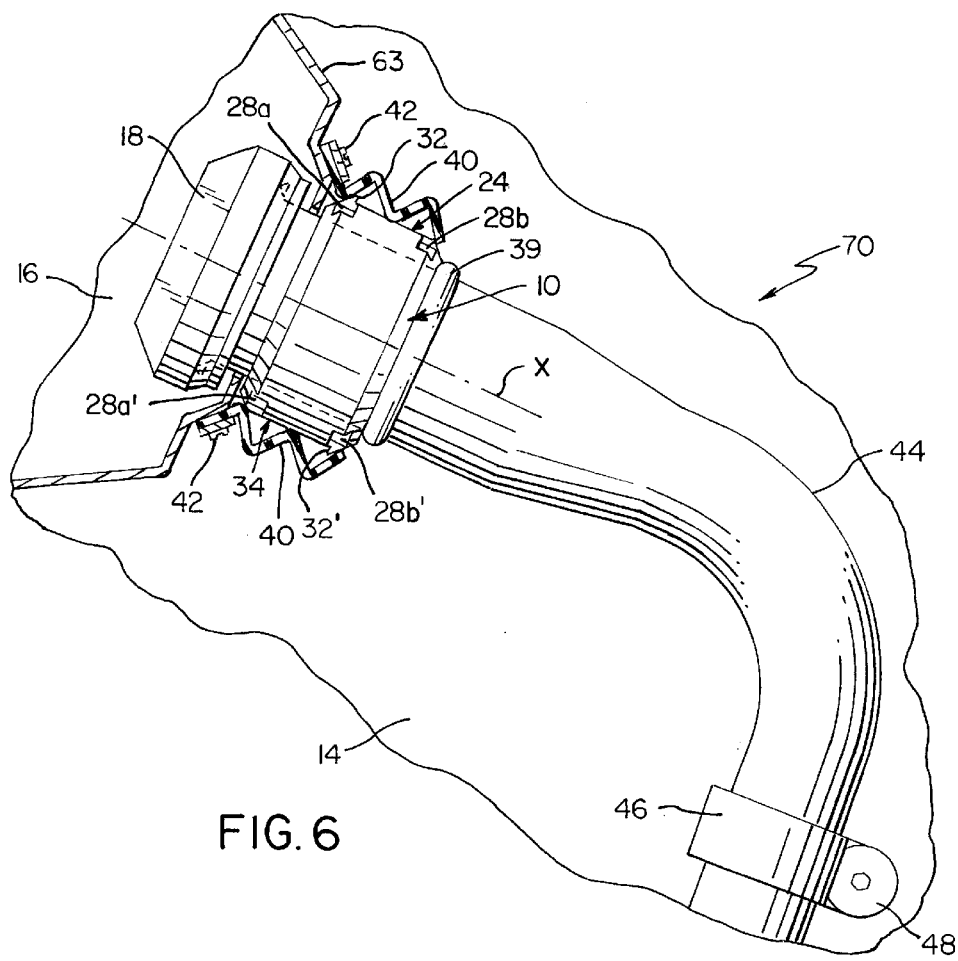

COLLAR FOR FUEL FILLER PIPE

BACKGROUND OF THE INVENTION

The invention relates generally to fuel filler apparatus connecting a fueling port and a tubular fuel filler pipe in a motor vehicle. More particularly, the invention relates to an improved collar which provides protection for the fuel filler pipe assembly housed in the fuel door recessed compartment of the motor vehicle and further provides support for the rubber boot surrounding the fuel filler pipe.

In the manufacture of automobiles, the end of the fuel filler pipe leading to the fuel tank is generally closed by a threaded cap or a cap having a bayonet-type connection. The cap may be locked and unlocked by the use of a key. The end of the fuel filler pipe is securely mounted in a recessed fuel filler compartment located on one side of the vehicle body. Generally, the fuel filler cavity further includes a hinged fuel filler door which may contain a locking mechanism.

The end of the fuel filler pipe is characterized as having a cup-shape provided with an annular flange around its perimeter. The annular flange is seated around an opening in the fuel filler cavity which leads to the interior of the fuel filler pipe by placing resilient material between the annular flange of the fuel filler pipe and the edge of the opening in the fuel filler cavity. Typically, the fuel filler pipe is provided with a second annular flange which defines a seat or throat area between the vehicle body and the second annular flange for accommodating a suitable retaining member by means of which the fuel filler terminal can be mounted in the fuel filler seat. Such assembly is described in U.S. Pat. No. 4,027,910 to Farelli.

In the assembly of the fuel pipe to the automobile body, a rigid collar is commonly employed as a protecting member for the fuel filler pipe and also as a support for a rubber boot surrounding the fuel assembly to allow escape of fresh air.

A rigid collar commonly used in the industry comprises three individual lightweight plastic sections which are difficult to assemble and require at least two separate actions involving at least two different directional motions in order to lock the three individual plastic parts together in a sub-assembly while connecting the fuel pipe to the vehicle. In a first action, two halves of the collar are aligned and fitted together and, in a second action, a third annular collar is placed around the two halves to hold them together. Accordingly, there is a need to provide a more simple collar assembly which comprises fewer separate parts, is easier and faster to assemble, and uses a more straight forward approach to lock the part together.

SUMMARY OF THE INVENTION

It is an object of the present invention to provide a fuel filler collar which is designed to overcome the above drawbacks of known fuel filler collars, and more specifically to provide a tubular collar which comprises no more than two separate parts which mate in a simple, single, straight forward push-in action to securely lock the two parts together. According to the present invention, the tubular collar for sealing a fuel filler assembly in a motor vehicle comprises two separate longitudinally semicircular shaped or C-shaped parts which interlock together to form a tubular collar around the fuel filler assembly at the upper end of the fuel filler pipe. Each end of the semicircular parts contains a male and a female locking surface aligned to mate with corresponding female and male locking surfaces on a similar end of an opposing semicircular shaped part. More specifically, when the ends of the two semicircular shaped parts face each other, the male elements on the ends of the semicircular shaped part readily interlock with the female elements on the facing ends of the opposing semicircular shaped part. The positional alignment of the male and female surfaces are preferably reversed in the opposite end of the same semicircular shaped part. In a preferred aspect of the invention, the male and female locking surfaces on one end of each semicircular shaped part are of a different size or other configuration to allow the semicircular shaped parts to be coupled together only in the desired alignment as discussed in further detail below.

In accordance with the invention, the two longitudinal semicircular shaped parts are easily locked together using a simple, single push-in motion to lock the two semicircular shaped parts securely together and form a collar around the fuel filler assembly.

BRIEF DESCRIPTION OF THE DRAWINGS

FIG. 4 is a side view of the collar sealing member of the present invention;

FIG. 5 is a cross-sectional view taken along lines 5—5 of FIG. 4 showing the male and female locking members in a locked position; and FIG. 6 is a partial view of an automobile showing a side view of a fuel filler compartment, fuel filler assembly and fuel filler pipe.

DETAILED DESCRIPTION OF THE INVENTION

Figure 1:
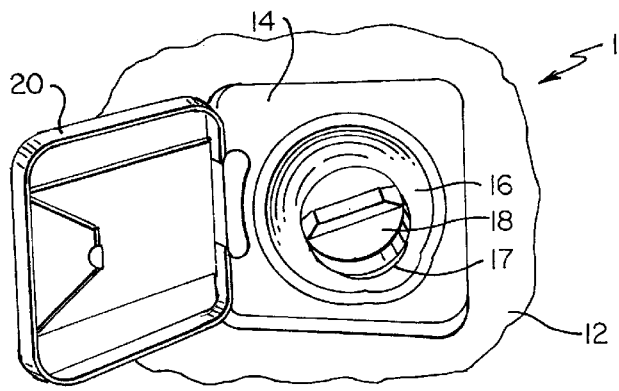
FIG. 1 is a partial view of an automobile fueling port showing a front elevational view of a fuel filler compartment.

With reference to FIG. 1, there is illustrated a typical fueling port 1 for introducing fuel into an automobile through a fuel nozzle (not shown) from a fuel source (not shown). The fueling port may be located on a rear panel 12 of an automobile. The fueling port consists of an inner panel 14, a recessed compartment 16, a tubular inlet 17 for accepting a cap 18, a hinged door 20 and a locking member for securing the door to the panel 12.

Turning to FIGS. 2 through 5, there is illustrated a novel collar 10 and connecting means for protecting a fuel assembly in a fueling port of an automobile. The collar 10 consists of two halves. Each half of the collar has a semicircular shaped structure which is similar, but not identical, to each other with respect to their structures.

Figure 2:
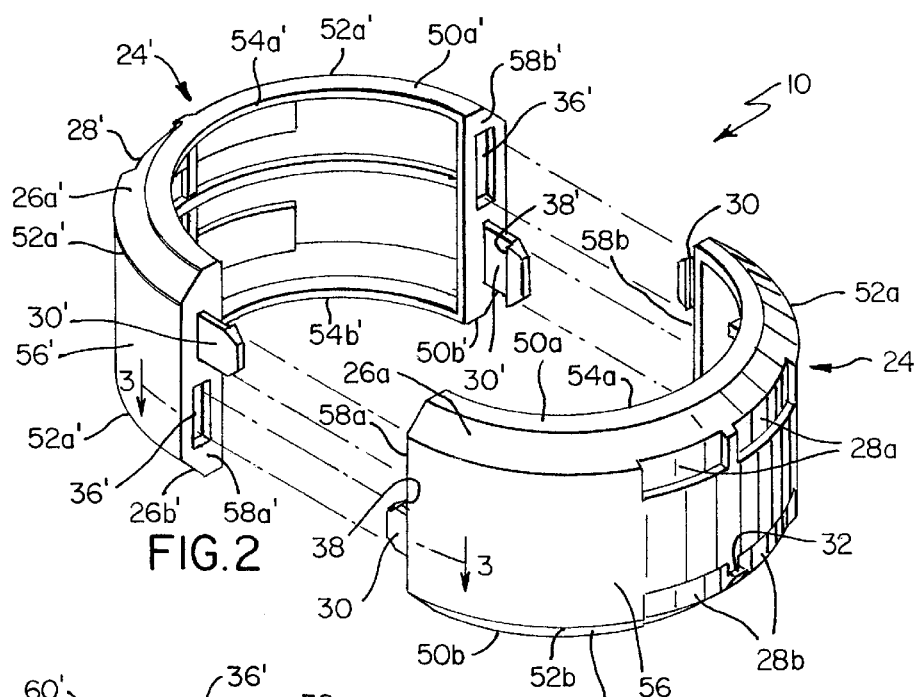
FIG. 2 is an exploded perspective view of the collar sealing member of the present invention.
Figure 3:
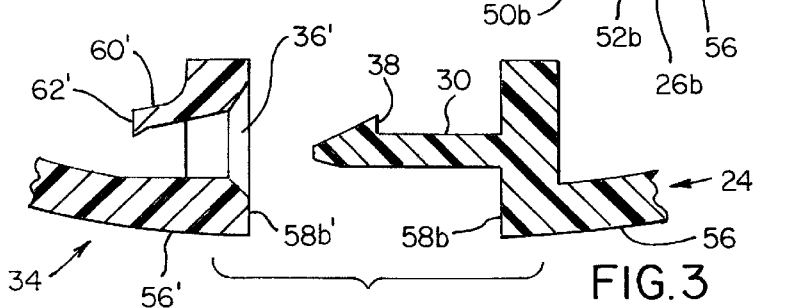
FIG. 3 is a cross-sectional view taken along lines 3—3 of FIG. 2 showing the male and female locking elements in an unlocked position.

As shown in FIG. 2, the fuel filler collar 10 of the invention comprises a first half which exhibits a semicircular shaped structure 24. At both the upper edge 52a and the lower edge 52b, respectively, of the first semicircular shaped structure 24, the structure 24 tapers inwardly to form an upper tapered arcuate surface 26a, and a lower tapered arcuate surface 26b. Upper tapered surface 26a, terminates in an upper shoulder 50a forming an arcuate rim 54a, and lower tapered surface 26b, terminates in lower shoulder 50b forming a lower arcuate rim 54b. Both shoulders 50a and 50b extend inwardly perpendicularly to the longitudinal axis X of the fuel filler collar structure 10.

The first C-shaped structure 24 includes a plurality of notches 28a and 28b in the upper and lower regions, respectively, of outer surface 56 of the first semicircular shaped structure 24. The upper notches 28a and the lower notches 28b further extend into the upper tapered surface 26a and the lower tapered surface 26b, respectively. Associated with the lower notches 28b, there are also included outwardly extending arm members 32 and 32' (FIG. 4) each of which cooperates with a boot 40 (FIG. 6) to provide an air passage for outside air into the fill nozzle by forcing the boot to deform over the arm members 32 and 32'.

At each of the ends 58a and 58b of the first semicircular shaped structure, there is formed a plurality of coupling members designed to cooperate with a similar plurality of corresponding coupling members formed on each of the ends 58a' and 58b' of the second semicircular shaped structure to provide the collar of the invention. Preferably, the coupling member is a male/female connection as shown in FIGS. 2 through 5 and more fully described below.

FIG. 2 also illustrates a second semicircular shaped structure 34 similar to the first semicircular shaped structure 24. The second semicircular shaped structure 24 includes a plurality of notches in the upper and lower regions of outer surface 56' equivalent to those shown in the first semicircular shaped structure 24; however, only one of the notches, 28a' is visible in the second semicircular shaped structure shown in FIG. 2. The upper notches 28a' and the lower notches 28b' (FIG. 4) further extend into the upper tapered surface 26a and the lower tapered surface 26b, respectively.

At each of the ends 58a' and 58b' of the second semicircular shaped structure 34, there is formed a plurality of coupling members designed to cooperate with a similar plurality of corresponding coupling members formed on each of the ends 58a and 58b of the first semicircular shaped structure 24 to provide the collar of the invention. As with the coupling members of the first semicircular shaped structure 24, the coupling members of the second semicircular shaped structure 34 are preferably a male/female connection.

At both the upper edge 52a' and the lower edge 52b' of the second semicircular shaped structure 34, the structure 34 tapers inwardly, respectively to form an upper tapered arcuate surface 26a' and a lower tapered arcuate surface 26b'. Upper tapered surface 26a' terminates in an upper shoulder 50a' forming an arcuate rim 54a', and lower tapered surface 26b' terminates in lower shoulder 50b' forming a lower arcuate rim 54b. Both shoulders 50a' and 50b' extend inwardly perpendicularly to the longitudinal axis of the fuel filler collar structure 10.

Turning now to FIGS. 4 and 5 which illustrate the fuel collar 10 of the invention wherein the first semicircular shaped structure and the second semicircular shaped structure are securely locked together, there is illustrated a novel collar 10 and connecting means for protecting a fuel assembly in a fueling port of an automobile. The collar 10 consists of two halves locked together. Each half of the collar 10 comprises a semicircular shaped structure, 24 and 34 which are similar, but not identical, to each other with respect to their structures.

FIG. 5 illustrates one of the plurality of male/female coupling members useful for locking the ends 58a and 58b of the first semicircular shaped structure to the ends 58a' and 58b', respectively, of the second semicircular shaped structure in a manner which provides the fuel filler collar of the invention. As shown in FIG. 5, a tabular member 30 protrudes from the end 58b of the first semicircular shaped structure and includes a catch 38 which, upon being inserted into the opening 36', is resiliently deformed until the catch passes the end 62 of locking member 60', whereupon the catch 38 grasps the end 62' of locking member 60'. It is to be understood that the other coupling members cooperate in a similar manner to complete the locking process.

FIG. 6 illustrates a fuel filler system 70 which includes a fuel filler pipe 44 connected to a recessed compartment 16 on an automobile interior panel 14. The fuel filler pipe is secured to the interior automobile panel 14 using, for example, a band connection 46 attached to the interior automobile panel with a mounting means 48 such as a screw, bolt, pin or the like. The upper end of the fuel pipe contains a shoulder member 38 to retain the collar 10. A flexible, corrugated boot 40 is positioned between the upper indentations 28a, 28a' and the lower indentations 28b and 28b'. The flexible corrugated boot 40 is further attached to the underside 62 of the recessed compartment 16 by fastening means 42, such as screws, bolts, pins, etc.

Placing the collar 10 on the fuel filler assembly is an easy one-motion step which comprises aligning the two C-shaped structures 24 and 34 and then simply pushing the two semicircular shaped structure 24 and 34 together until locking of the parts is achieved.

The two structures described herein to form the collar of the present invention have been defined as being semicircular shaped. By semicircular shaped structure it is meant that the structure is a C-shaped structure wherein the outer diameter is larger than the inner diameter. The outer diameter is measured between a point on the outer circumferential edge of one end of the C-shaped structure and a corresponding point on the outer circumferential edge of the other end of the C-shaped structure to determine the outer diameter of the C-shaped structure, and the inner diameter is measured between a point on the inner circumferential edge of one end of the C-shaped structure and a corresponding point on the inner circumferential edge of the other end of the C-shaped structure to determine the inner diameter of the C-shaped structure.

The collar of the invention is made from a rigid material, preferably a polymeric material such polyolefins, e.g., polypropylene, high density polyethylene, etc.; nylons; halogenated polyolefins, such as fluoropolymers and copolymers; polyethyleneterephthalate; and the like; and mixtures and blends thereof. Polypropylene has been found to be particularly effective in manufacturing the collar of the present invention.

Alternative structure means and other changes may be made to the collar and to the assembly of the specific parts of the collar of the present invention; however, it is to be understood that such alternative means and other changes are intended to be within the scope of the appended claims.

What is claimed is:

1. An annular, fuel filler assembly collar, said annular collar formed from two interlocking structures comprising:

a) a first semicircular shaped structure including;
   a first pair of terminal ends residing in a common vertical plane, each of said terminal ends including locking means;
   a top edge forming an upper semicircular rim having a surface perpendicular to the longitudinal axis of said first semicircular shaped structure;
   a bottom edge forming a lower semicircular rim having a surface perpendicular to the longitudinal axis of said second semicircular shaped structure, said top edge and said bottom edge residing in spaced apart horizontal planes with respect to each other;
   a first outer circumferential side separating said top edge and said bottom edge; and
   one or more notches in the upper surface of said first circumferential side intermediate said pair of terminal ends; and b) A second semicircular shaped structure including;
   a second pair of terminal ends residing in a common vertical plane, each of said terminal ends including locking means, a top edge forming an upper semicircular rim having a surface perpendicular to the longitudinal axis of said second semicircular shaped structure;

a bottom edge forming a lower semicircular rim having a surface perpendicular to the longitudinal axis of said second semicircular shaped structure, said top edge and said bottom edge residing in spaced apart horizontal planes with respect to each other; and a second outer circumferential side separating said top edge and said bottom edge; and one or more notches in the upper surface of said second outer circumferential side intermediate said pair of terminal ends, wherein said first semicircular shaped structure and said second semicircular structure are locked together at said first and said second pair of terminal ends in a simple one-motion step by pushing said structures together until locking of said structures is accomplished, with the proviso that said locking is accomplished in the absence of a separate annular locking structure.

2. The collar of claim 1 wherein each of said terminal ends in said first semicircular structure and each of said terminal ends in said second semicircular structure includes a first locking member and a second locking member.

3. The collar of claim 2 wherein said first locking member comprises a protruding shaft having a barb member extending from the terminal end of said protruding shaft, said protruding shaft designed to be inserted into a corresponding opening and coupled therewith and said second locking member comprises an opening designed to accept a corresponding shaft.

4. The collar of claim 3 wherein said protruding shaft and corresponding opening on one of said terminal end is of a different size from the protruding shaft and the corresponding opening on the other terminal end.

5. The collar of claim 1 wherein said first semicircular structure and said second semicircular structure further includes an upper shoulder area tapered inwardly from said outer circumferential side to said top edge and extending uniformly from one of said pair of terminal ends to the other of said terminal ends.

6. The collar of claim 1 wherein said first semicircular structure and said second semicircular structure further includes a lower shoulder area tapered inwardly from said outer circumferential side to said bottom edge and extending uniformly from one of said pair of terminal ends to the other of said terminal ends.

7. The collar of claim 1 wherein said first semicircular structure and said second semicircular structure are made from a rigid plastic material.

8. The collar of claim 7 wherein said plastic material is selected from the group consisting of polypropylene, high density polyethylene, nylon, polyethyleneterephthalate and halogenated polyolefins.

9. The collar of claim 8 wherein said plastic material is polypropylene.

10. The collar of claim 1 wherein said outer circumferential side separating said top edge and said bottom edge of said first semicircular shaped structure includes a first outer circumferential surface having one or more notches formed in the upper surface thereof intermediate said first pair of terminal ends, and said outer circumferential side separating said top edge and said bottom edge of said second semicircular shaped structure includes a second outer circumferential surface having one or more notches formed in the upper surface thereof intermediate said second pair of terminal ends and each of said first and said second outer circumferential surfaces further includes one or more arm members extending outwardly therefrom formed in each of an upper region thereof and a lower region thereof, said one or more notches configured to cooperate with a fuel filler assembly boot to provide an air passage for outside air into a fill nozzle by forcing said fuel filler assembly boot to deform over said arm members.

11. The collar of claim 10 wherein each of said first and said second outer circumferential surfaces further includes one or more are members extending outwardly therefrom, wherein said one or more notches and said one or more arms are configured to cooperate with a fuel filler assembly boot to provide an air passage for outside air to flow into a fill nozzle by forcing said fuel filler assembly boot to deform over said arm members.

12. A plastic collar for use in a fuel filler assembly comprising:

a) a first semicircular shaped plastic structure including;
  a first pair of terminal ends which lie in a common vertical plane, each of said terminal ends including a first locking means and a second locking means, said first locking means comprising a protruding shaft having a barb member extending from the terminal end thereof, and said second locking means comprising an opening designed to accept said protruding shaft, the protruding shaft and the opening on one terminal end being of a different size than the protruding shaft and the opening on the other of said terminal end,
  a top edge forming an upper semicircular rim, said top edge having a surface perpendicular to the longitudinal axis of said semicircular structure,
  a bottom edge forming a lower semicircular rim, said bottom edge having a surface perpendicular to the longitudinal axis of said semicircular structure, said top edge and said bottom edge residing in spaced apart horizontal planes with respect to each other,
  an outer circumferential side separating said top edge and said bottom edge,
  an upper shoulder area tapered inwardly from said outer circumferential side to said top edge and extending uniformly from one of said pair of terminal ends to the other of said terminal ends,
  a lower shoulder area tapered inwardly from said outer circumferential side to said bottom edge and extending uniformly from one of said pair of terminal ends to the other of said terminal ends, and
  one or more notches formed in each of the upper surface and the lower surface of said circumferential side intermediate said pair of terminal ends; and b) a second semicircular shaped plastic structure having:
  a second pair of terminal ends which lie in a common vertical plane, each of said terminal ends including a first locking means and a second locking means, said first locking means comprising a protruding shaft having a barb member extending from the terminal end thereof, and said second locking means comprising an opening designed to accept said protruding shaft, the protruding shaft and the opening on one terminal end being of a different size than the protruding shaft and the opening on the other of said terminal end,
  a top edge forming an upper semicircular rim, said top edge having a surface perpendicular to the longitudinal axis of said semicircular structure,
  a bottom edge forming a lower semicircular rim, said bottom edge having a surface perpendicular to the longitudinal axis of said semicircular structure, said top edge and said bottom edge residing in spaced apart horizontal planes with respect to each other,
  an outer circumferential side separating said top edge and said bottom edge, an upper shoulder area tapered inwardly from said outer circumferential side to said top edge and extending uniformly from one of said pair of terminal ends to the other of said terminal ends, a lower shoulder area tapered inwardly from said outer circumferential side to said bottom edge and extending uniformly from one of said of terminal ends to the other of said terminal ends; and one or more notches formed in each of the upper surface and the lower surface of said circumferential side intermediate said pair of terminal ends, wherein said first semicircular structure and said second semicircular structure are locked together at said first pair of terminal ends and at said second pair of terminal ends in a simple one-motion step by pushing said structures together until locking of said structures is accomplished.

13. The plastic collar of claim 12 wherein said plastic collar is made from a polymeric material selected from the group consisting of polypropylene, high density polyethylene, nylon, polyethyleneterephthalate and halogenated polyolefins.

14. The plastic collar of claim 13 wherein said polymeric material is polypropylene.

15. In a fuel filler system including a fuel filler pipe attached at its lower end to a fuel receiving tank and at its upper end to a fuel filler inlet tube adapted to receive a fuel cap, a three component collar surrounding said fuel pipe and a rubber boot surrounding said three component collar, said three component collar including a first semicircumferential member, a second semicircumferential member and an annular unitary circumferential member wherein the first semicircumferential member and the second semicircumferential member are placed together in a first action to form a sub-assembly and, in a second different directional action, the sub-assembly is locked together using an annular structure wherein the annular structure is snapped in place around the sub-assembly, the improvement comprising:

employing a two component plastic collar to surround said fuel filler pipe, said two component collar comprising:

a) a first semicircular shaped plastic structure including;

a first pair of terminal ends which lie in a common vertical plane, each of said terminal ends including a first locking means and a second locking means, said first locking means comprising a protruding shaft having a barb member extending from the terminal end thereof, and said second locking means comprising an opening designed to accept said protruding shaft, the protruding shaft and the opening on one terminal end being of a different size than the protruding shaft and the opening on the other of said terminal end, a top edge forming an upper semicircular rim, said top edge having a surface perpendicular to the longitudinal axis of said semicircular structure, a bottom edge forming a lower semicircular rim, said bottom edge having a surface perpendicular to the longitudinal axis of said semicircular structure, said top edge and said bottom edge residing in spaced apart horizontal planes with respect to each other, an outer circumferential side separating said top edge and said bottom edge, an upper shoulder area tapered inwardly from said outer circumferential side to said top edge and extending uniformly from one of said pair of terminal ends to the other of said terminal ends, a lower shoulder area tapered inwardly from said outer circumferential side to said bottom edge and extending uniformly from one of said pair of terminal ends to the other of said terminal ends, and one or more notches formed in each of the upper surface and the lower surface of said circumferential side intermediate said pair of terminal ends; and b) a second semicircular shaped plastic structure having:

a second pair of terminal ends which lie in a common vertical plane, each of said terminal ends including a first locking means and a second locking means, said first locking means comprising a protruding shaft having a barb member extending from the terminal end thereof, and said second locking means comprising an opening designed to accept said protruding shaft, the protruding shaft and the opening on one terminal end being of a different size than the protruding shaft and the opening on the other of said terminal end, a top edge forming an upper semicircular rim, said top edge having a surface perpendicular to the longitudinal axis of said semicircular structure, a bottom edge forming a lower semicircular rim, said bottom edge having a surface perpendicular to the longitudinal axis of said semicircular structure, said top edge and said bottom edge residing in spaced apart horizontal planes with respect to each other, an outer circumferential side separating said top edge and said bottom edge, an upper shoulder area tapered inwardly from said outer circumferential side to said top edge and extending uniformly from one of said pair of terminal ends to the other of said terminal ends, a lower shoulder area tapered inwardly from said outer circumferential side to said bottom edge and extending uniformly from one of said pair of terminal ends to the other of said terminal ends, and one or more notches formed in each of the upper surface and the lower surface of said circumferential side intermediate said pair of terminal ends, wherein said first semicircular structure and said second semicircular structure are locked together at said first pair of terminal ends and at said second pair of terminal ends in a simple one-motion step by pushing said structures together until locking of said structures is accomplished.

16. The fuel filler system of claim 15 wherein said first semicircular structure is locked to said second semicircular structure with the proviso that said locking is accomplished in the absence of a separate annular locking structure.

17. The fuel filler system of claim 15 wherein said plastic collar is made from a polymeric material selected from the group consisting of polypropylene, high density polyethylene, nylon, polyethyleneterephthalate and halogenated polyolefins.

18. The fuel filler system of claim 17 wherein said polymeric material is polypropylene.

* * * * *